US009638931B2

(12) United States Patent
Terajima (10) Patent No.: US 9,638,931 B2
(45) Date of Patent: May 2, 2017

(54) LENS DRIVER WITH CAMERA SHAKE REDUCING FUNCTION

(71) Applicants: Huizhou Dayawan Ever Bright Electronic Industry Co., Ltd, Guangdong (CN); JSS Optical Technology Co., Ltd, Hong Kong (CN); Huizhou Daya Bay Jss Optical Technology.Co., Ltd, Guangdong (CN)

(72) Inventor: Kokichi Terajima, Tokyo Matsugaya (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (CN); HUIZHOU DAYA BAY JSS OPTICAL TECHNOLOGY.CO., LTD., Huizhou (*) Notice: Subject to any disclaimer, the term of this patent is extended or adjusted under 35 U.S.C. 154(b) by 0 days.

(21) Appl. No.: 14/825,822

(22) Filed: Aug. 13, 2015

(65) Prior Publication Data
US 2016/0231586 A1    Aug. 11, 2016

(30) Foreign Application Priority Data

Feb. 6, 2015   (JP) ................................ 2015-022188

(51) Int. Cl.
*G02B 27/64*   (2006.01)
*G02B 7/09*    (2006.01)
*G02B 7/08*    (2006.01)

(52) U.S. Cl.
CPC ............. *G02B 27/646* (2013.01); *G02B 7/08* (2013.01)

(58) Field of Classification Search
CPC ... G03B 5/00; G03B 5/02; G03B 5/04; G03B 5/06; G03B 5/08; H04N 5/23264; H04N 5/2328; H04N 5/23287; G02B 27/646
(Continued)

(56) References Cited

U.S. PATENT DOCUMENTS

2015/0286109 A1* 10/2015 Park ........................ G03B 3/02
                                                     396/529
2015/0331251 A1* 11/2015 Hu ....................... G02B 27/646
                                                     359/824

FOREIGN PATENT DOCUMENTS

JP         2013024938         2/2013

* cited by examiner

*Primary Examiner* — Rochelle-Ann J Blackman
(74) *Attorney, Agent, or Firm* — Hemisphere Law, PLLC (57) ABSTRACT

A lens driver with camera shake reducing function, in which the spring member is easily mountable, and the spring member does not undergo a plastic deformation. The lens driver with camera shake reducing function takes the direction of the photographed object as the forward direction of the optical axis of the lens, comprising: a focusing unit, which causes a lens holder holding the lens to move in the direction of the optical axis; and a camera shake reducing unit, which causes the focusing unit to swing in a direction orthogonal to the direction of the optical axis, characterized in that, comprising: a connecting hole, which is formed at the focusing unit and the camera shake reducing unit and which is opened in the direction of the optical axis; a spring member, which extends in the direction of the optical axis and the end of which passes through the connecting hole; and an open route, which extends from the connection hole of at least one of the focusing unit and the camera shake reducing unit in a direction orthogonal to the optical axis, and which engages the spring member temporarily before the spring member is connected to the connecting hole.

4 Claims, 6 Drawing Sheets

LENS DRIVER WITH CAMERA SHAKE REDUCING FUNCTION

TECHNICAL FIELD

The invention relates to a lens driver for cameras of mobile phones, etc., and in particular, to a lens driver with camera shake reducing function which automatically corrects the camera shake caused by the camera while driving the camera for an auto-focusing.

BACKGROUND

A lens driver with camera shake reducing function utilizes the auto-focusing function to perform the focusing, meanwhile it causes the lens to swing in a direction at right angle to (orthogonal to) the optical axis direction of the lens according to the camera shake generated in photographing, so as to suppress the blurring of the image that is imaged on the image sensor.

For example, a lens driver with camera shake reducing function is proposed in patent document 1, which utilizes a linear spring member extending along the optical axis direction to support a focusing unit for focusing of the lens in form of suspending rack such that the focusing unit may swing, so as to suppress a blurring of the image.

Figure 6:
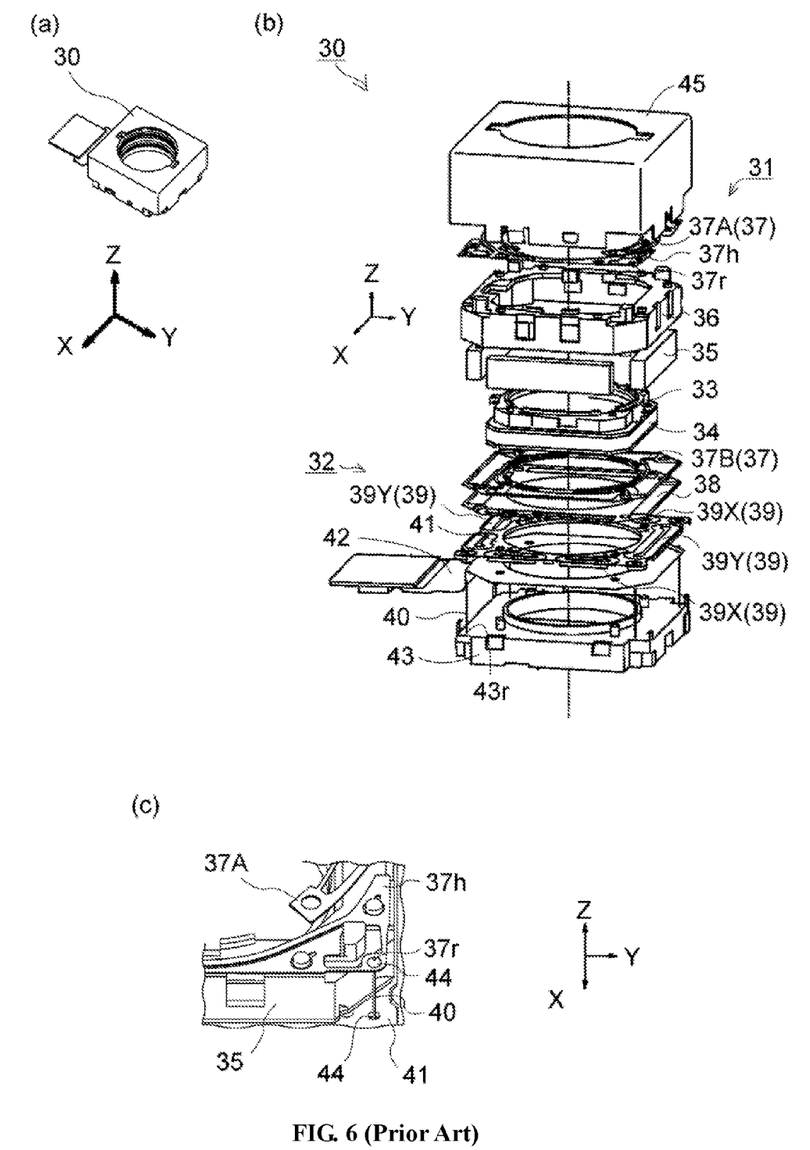
FIG. 6 is an illustration of appearance and internal structure of the prior lens driver with camera shake reducing function.

FIG. 6 is an illustration of a lens driver 30 with camera shake reducing function from the prior art. FIG. 6(a) is a perspective view of the lens driver 30 with camera shake reducing function, FIG. 6(b) is an exploded view and FIG. 6(c) is an enlarged view of the main part. The optical axis of the not illustrated lens is set to Z (Z-axis) direction and two directions orthogonal to Z-axis are set to X (X-axis) direction and Y (Y-axis) direction, and a direction of the photographed object is set to forward direction of the optical axis direction (+Z side, front side).

As illustrated in FIG. 6(a), the lens driver 30 with camera shake reducing function is generally rectangular, and its central portion is opened in Z-direction in form of a circle, so as to hold the not illustrated lens. As illustrated in FIG. 6(b), the lens driver 30 with camera shake reducing function is composed of a focusing unit 31 and a camera shake reducing unit 32.

The focusing unit 31 is composed of a lens holder 33, a focusing coil 34, a magnet 35, a magnet holder 36, a plate-like spring member 37 and a separator 38. Furthermore, the camera shake reducing unit 32 is composed of a coil for swinging 39, a printed circuit board 41, a flexible printed circuit board 42, a linear spring member 40 and a base 43.

The lens holder 33 of the focusing unit 31 is a cylindric member which is opened in Z-direction and which serves to hold the lens on its inner circumference. The focusing coil 34 is wound, according to the shape of the outer circumference of the lens holder 33, onto the outer circumference of the lens holder 33. On the outer diameter side of the focusing coil 34, a magnet 35 formed by permanent magnet faces the focusing coil 34 with a gap in the redial direction. The magnet 35 is plate-like, and held by a magnet holder 36 in form of a box with four borders. Moreover, the magnets 35 are spaced at a interval of 90 degree around Z-axis in a manner that their magnet poles face X-direction and Y-axis.

The plate-like spring member 37 is composed of a front spring member 37A and a back spring member 37B. The inner circumference of the front spring member 37A and the back spring member 37B is connected with the end face on +Z side of the lens holder 33 and the end face on −Z side of the lens holder 33. The outer circumference of the front spring member 37A and the back spring member 37B is connected with the end face on +Z side of the magnet holder 36 and the end face on −Z side of the magnet holder 36. In this way, the front spring member 37A and the back spring member 37B support the lens holder 33 in form of suspending rack such that they may move along Z-axis.

Furthermore, on −Z side of the back spring member 37B, a separator 38 is arranged. The separator 38 clamps, together with the end face on −Z side of the magnet holder 36, the outer circumference of the back spring member.

When the focusing coil 34 is electrified, the focusing unit 31 built as described above generates a Lorentz force in Z-axis direction, which may move the lens holder 33 in Z-axis direction.

The camera shake unit 32 is built by stacking respective members on the plate-like base 43 which is opened in the center and oriented in Z-axis direction. In particular, a flexible printed circuit board 42 is mounted on +Z side surface of the base 43, and on the +Z side surface of the flexible circuit board 42, a printed circuit board 41 is mounted. On the printed circuit board 41, a coil for swinging 39 is arranged which is supplied with power externally via the flexible printed circuit board 42.

The coil for swinging 39 is wound along Z-axis, and is composed of X side coils for swinging 39X, which are arranged on −X side and +X side of the printed circuit board 41, and Y side coils for swinging 39Y, which are arranged on −Y side and +Y side. Furthermore, the coils for swinging 39 faces the −Z side surface of the magnet 35 at an interval in Z-axis direction.

The spring member 40 is a linear spring which extends in Z-direction and which is arranged on four corners of the base 43. An end of the spring member 40 passes through a connecting hole 43r formed on the base 43r and an connecting hole 37r formed on the front spring member 37A, so as to support the focusing unit 31 such that it may swing in X-axis direction and Y-axis direction. More specifically, as shown in FIG. 6(c), on the outer holding portion 37h of the front spring member 37A, a connecting hole 37r is formed, and on four corners of the base 43, connecting holes 43r are formed.

Furthermore, a shielding housing 45 is a box with a round opening, which surrounds the outer circumference of the focusing unit 31 and the camera shake unit 32.

When the X side coil for swinging 39X of the camera shake reducing unit 32 as built above is electrified, this X side coil for swinging 39X will generate a Lorentz force in X-axis direction, and the focusing unit 31 may be moved in X-axis direction using the reaction force generated on the magnet 35. Furthermore, as to the Y side coil for swinging 39Y, when this Y side coil for swinging 39Y is electrified, it will generate a Lorentz force in Y-axis direction, and the focusing unit 31 may be moved in Y-axis direction using the reaction force generated on the magnet 35.

PRIOR ART

Patent Document

Patent document 1: Japanese patent publication No. JP 2013-24938.

As a method for mounting the linear spring member 40 at the base 43 and the front spring member 37A, the spring member 40 is pinched using tweezers, etc., so that the spring member 40 faces Z-direction and passes through the connecting hole 37r from +Z side and is inserted into the connecting hole 43r of the base 43. Next, the +Z side end of the spring member 40 should be firmly connected to the connecting hole 37r using tin solder, glue, etc., and the −Z side end of the spring member 40 is firmly connected to the connecting hole 43r using a firm connection member 44, but this mounting operation requires proficient skills.

However, it is difficult to pass the end of the spring member 40 through the connecting holes 37r and 43r without contacting the circumference of connecting holes 37r and 43r. If the end of the spring member 40 contacts the front spring member 37A, then the outer holding portion 37h will undergo a deformation of bending; and if the end of the spring member 40 contacts the base 43, then the spring member 40 will undergo a deformation of bending, and it is possible that the front spring member 37A and the linear spring member 40 are degraded.

As described above, if a lens driver 30 with camera shake reducing function is assembled in the case of a damaged front spring member 37A and linear spring member 40, then the optical axis of the lens mounted at the lens driver 30 with camera shake reducing function will be tilted. If a photographing is performed in the case of a tilted optical, then problems may occur such as the photographed image is deformed, the camera shake unit 32 is unable to swing the focusing unit 31 accurately in X-axis direction and Y-axis direction, and the function of the lens driver 30 with camera shake reducing function may be hindered.

SUMMARY OF THE INVENTION

It is the object of the invention, to provide a lens driver with camera shake reducing function, in which the spring member is easily mountable, and the spring member doesnot undergo a plastic deformation.

The lens driver with camera shake reducing function of the invention takes the direction of the photographed object as the forward direction of the optical axis of the lens, comprising: a focusing unit, which causes a lens holder holding the lens to move in the direction of the optical axis; and a camera shake reducing unit, which causes the focusing unit to swing in a direction orthogonal to the direction of the optical axis, characterized in that, comprising: a connecting hole, which is formed at the focusing unit and the camera shake reducing unit and which is opened in the direction of the optical axis; a spring member, which extends in the direction of the optical axis and the end of which passes through the connecting hole; and an open route, which extends from the connection hole of at least one of the focusing unit and the camera shake reducing unit in a direction orthogonal to the optical axis, and which engages the spring member temporarily before the spring member is connected to the connecting hole.

In the case of the lens driver with camera shake reducing function as built above, the spring member may be easily mounted and the spring member will not fall off from the connecting hole when being mounted.

Furthermore, the invention is characterized in that, the open route is hook-shaped.

Thus, when mounting the spring member at the connecting hole, the spring member will not be damaged.

Furthermore, the invention is characterized in that, the width of the open route is smaller than the outer diameter of the spring member.

In this way, when mounting the spring member at the connecting hole, the spring member will not be damaged, and it can be reliably prevented that the spring member falls off from the connecting hole.

Moreover, the invention is characterized in that, the open route is formed radially on a side of the connecting hole and a notch is formed radially on another side of the connecting hole.

Thus, when inserting the spring member into the connecting hole via the open route, the possibility of damaging the spring member may be further decreased.

Furthermore, the above summary of the invention does not enumerate all features which the invention requires, and a re-combination of the above features also falls within the scope of the invention.

DESCRIPTION OF REFERENCE NUMERALS

10 lens driver with camera shake reducing function
11 focusing unit
12 camera shake unit
13 lens holder
14 focusing coil
15 magnet
16 magnet holder
17 spring member
19 coil for swinging
20 spring member

DETAILED DESCRIPTION OF THE INVENTION

In the following, the invention is described in conjunction with embodiments in detail, but the embodiments below do not constitute any limitation on the invention; furthermore, a combination of all features described in the embodiments is not essential for the problem-solving technical means of the invention.

FIG. 1(a) is a perspective view of the lens driver 10 with camera shake reducing function of the first embodiment, FIG. 1(b) is an exploded perspective view of the lens driver 10 with camera shake reducing function, and FIG. 6(c) is an front view of the front spring member 17A. In the following, the direction of the optical axis 0 of the lens 18 is set to Z-axis direction and the side of the photographed object is set to the forward direction of the Z-axis direction (+Z side, the front side), and two directions orthogonal to Z-axis are set to X-axis direction and Y-axis direction.

As illustrated in FIG. 1(a), the lens driver 10 with camera shake reducing function is generally rectangular, and its central portion is opened in Z-direction in form of a circle, so as to hold the lens 18. As illustrated in FIG. 1(b), the lens driver 10 with camera shake reducing function is composed of a focusing unit 11 and a camera shake reducing unit 12.

As illustrated in FIGS. 1(a) and 1(b), the focusing unit 11 comprises a lens holder 13, a focusing coil 14, a magnet 15, a magnet holder 16, and a plate-like spring member 17. Furthermore, the camera shake reducing unit 12 comprises a coil for swinging 19, a linear spring member 20 and a base 21.

The lens holder 13 of the focusing unit 11 is a cylindric member which is opened in Z-direction and which serves to hold the lens 18 on its inner circumference. The focusing coil 14 is wound, according to the shape of the outer circumference of the lens holder 13, onto the outer circumference of the lens holder 13. On the outer diameter side of the focusing coil 14, a magnet 15 formed by permanent magnet faces the focusing coil 14 with a gap in the redial direction. The magnet 15 is plate-like, and held by a magnet holder 16 in form of a box with four borders. A plurality of magnets 15 are spaced at a interval of 90 degree around Z-axis in a manner that their magnet poles face X-direction and Y-axis.

As shown in FIGS. 1(b) and 1(c), the spring member 17 is plate-like, including a front spring member 17A and the back spring member 17B. The front spring member 17A is composed of: a ring-shaped inner holding portion 17a; an outer holding portion 17b in form of a box with four borders; a plurality of arms 17c which are located between the inner holding portion 17a and the outer holding portion 17b and which are repeatedly bended in radial and circumferential direction so as to connect the inner holding portion 17a and the outer holding portion 17b; connecting holes 17r which are formed on four corners of the outer holding portion 17b; and open routes 17k which is formed by cutting off a part of the connecting holes 17r and which extend from the connecting holes 17r. The open routes 17k are orthogonal to the optical axis and are hook-shape. Furthermore, the open routes 17k extend from the connecting holes 17r generally parallel to the borders of outer holding portion 17b, and form a shape that is opened towards the outside of the outer holding portion 17b.

As shown in FIG. 1(b), the back spring member 17B is composed of: a ring-shaped inner holding portion 17a; an outer holding portion 17b in form of a quadrangle with four corners being cut off; a plurality of arms 17c which are located between the inner holding portion 17a and the outer holding portion 17b and which are repeatedly bended in radial and circumferential direction so as to connect the inner holding portion 17a and the outer holding portion 17b.

The inner holding portions 17a of the front spring member 17A and the back spring member 17B are connected with the end face on +Z side and the end face on −Z side of the lens holder 13. Furthermore, the outer holding portions 17b of the front spring member 17A and the back spring member 17B are connected with the end face on +Z side and the end face on −Z side of the magnet holder 16. In this way, the front spring member 17A and the back spring member 17B support the lens holder 13 in form of suspending rack such that they may move in Z-direction.

The base 21 of the camera shake unit 12 is a plate which is opened in the center and oriented in Z-axis direction, and coils for swinging 19 are arranged on the base 21. Connecting holes 21r are formed on four corners of the base 21, for connecting the end 20b on back side of the linear spring member 20 as described below. The coil for swinging 19 is composed of X side coils for swinging 19X, which are arranged on −X side and +X side of the base, and Y side coils for swinging 19Y, which are arranged on −Y side and +Y side. Furthermore, the coil for swinging is wound in Z-axis direction, and faces the −Z side lateral surface of the magnet 15 at an interval in Z-axis direction.

The spring member 20 is a linear spring which extends in Z-direction and which four spring members 20 are arranged in this embodiment. An end 20a on front side and an end 20b on back side of the spring member 20 respectively passes through (connects) a connecting hole 17 formed on front side and a connecting hole 21r formed on the base 21, so as to support the focusing unit 11 such that it may swing in X-axis direction and Y-axis direction.

When the focusing coil 14 is electrified, the focusing unit 11 built as described above generates a Lorentz force in Z-axis direction, which may move the lens holder 13 in Z-axis direction.

If the X side coil for swinging 19X of the camera shake reducing unit 12 is electrified, then on the X side coil for swinging 19X, a Lorentz force will be generated in X-axis direction, and the focusing unit 11 may be moved in X-axis direction using the reaction force generated on the magnet 15. Furthermore, when the Y side coil for swinging 19Y is electrified, on the Y side coil for swinging 19Y, a Lorentz force will be generated in Y-axis direction, and the focusing unit 11 may be moved in Y-axis direction using the reaction force generated on the magnet 15.

As to the mounting methods of the spring members 20, after the back end 20b is embedded into the connecting hole 21r and is slightly tilted relative to Z-axis, the front end 20a is inserted from the open side of open route 17k formed at the front spring member 17A and moved to the connecting hole 17r. Because the open route 17k is bent as a hook, even if the front end 20a is engaged in the middle of the open route 17k before it is fixated, the front end 20a will not fall off onto the outside of the connecting hole 17r. Next, the front end 20a is connected at the center of the connecting hole 17r via tin solder 22, etc. with the front spring member 17A. More specifically, after the tin solder 22 melt using a heating element such as electric soldering iron, laser, etc. is traversely attached to the circumference of the connecting hole 17r and the front end 20a, it is cooled, solidified and cured. Even the front end 20 of the spring member 20, which is temporarily engaged in the middle of the open route 17k, can still dragged onto the center of the connecting hole 17r as the tin solder 22 is solidified. Subsequently, the front end 20a and the tin solder 22 are together fixated at the center of the connecting hole 17r. The back end 20b of the spring member 20 is firmly connect to the connecting hole 21r via a firm connection member 23 such as tin solder 22 or binder.

Figure 1:
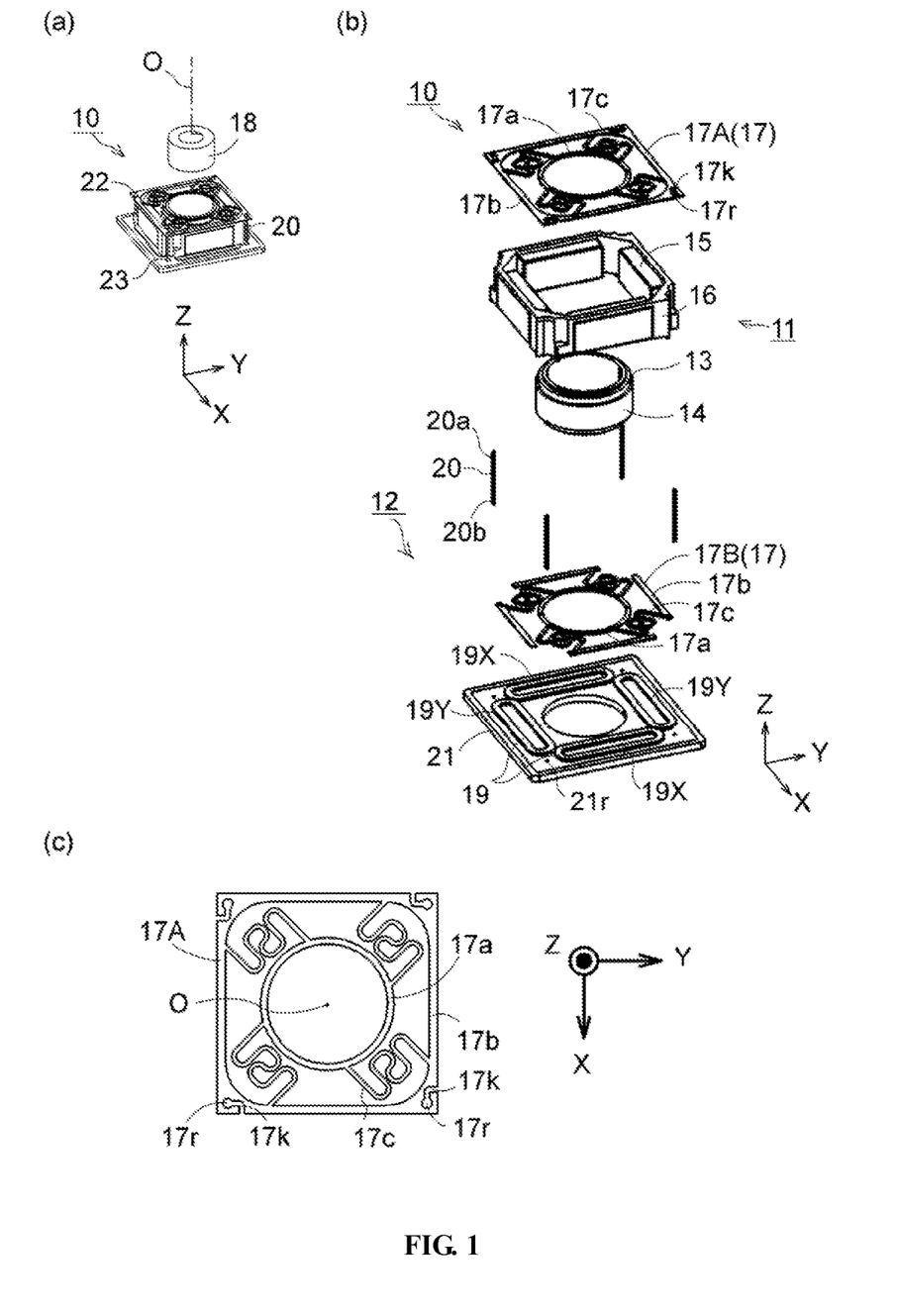
FIG. 1 is an illustration of appearance and internal structure of the lens driver with camera shake reducing function of the first embodiment.

In this way, no stress acts on the front spring member 17A and the linear spring member 20, and the spring member 20 may be easily mounted at the connecting hole 17 without damaging the front spring member 17A and spring member 20. By doing this, the lens 18 of the lens driver 10 with camera shake reducing function may held at the lens holder 13 in a state of facing Z-axis accurately, therefore, the focusing unit 11 may accurately swing in X-axis direction and Y-axis direction.

Figure 2:
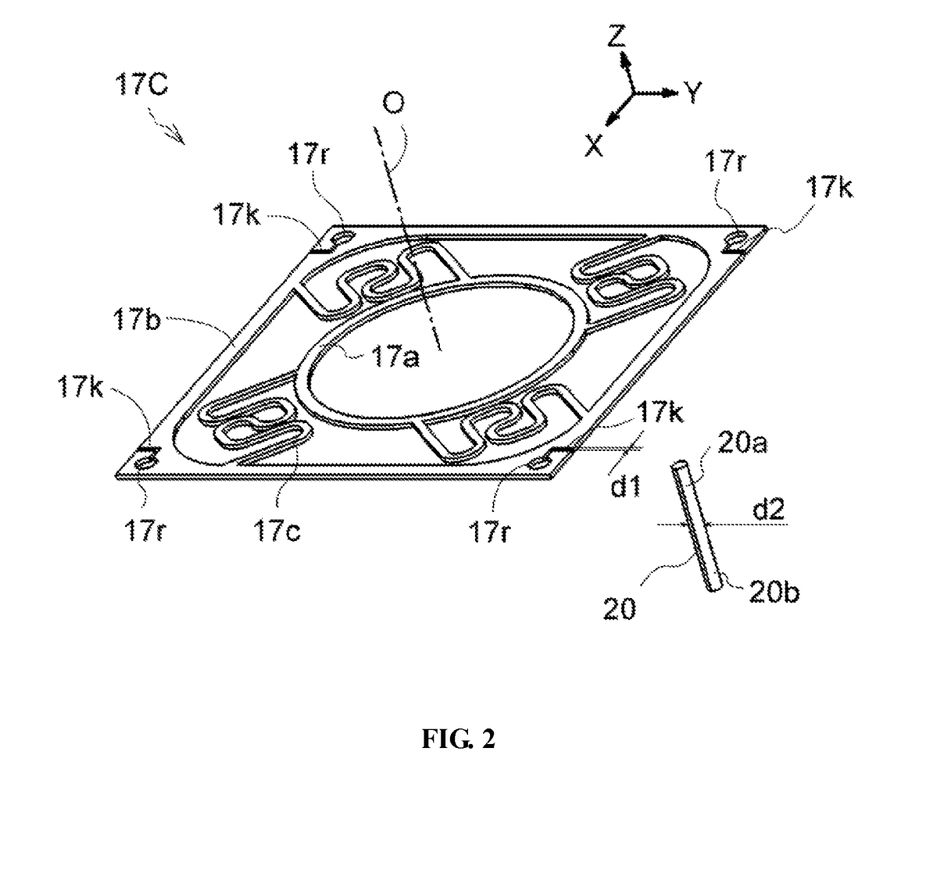
FIG. 2 is an illustration of the main part of a lens driver with camera shake reducing function of a variation of the second embodiment.

FIG. 2 is a perspective view of a plate-like front spring member 17C of a second embodiment. Furthermore, the structure of other members than the front spring member 17C is the same as the structure of the lens driver 10 with camera shake reducing function of the first embodiment, and thus its illustration is omitted.

The front spring member 17C comprises: a ring-shaped inner holding portion 17a; an outer holding portion 17b in form of a box with four borders; a plurality of arms 17c which are located between the inner holding portion 17a and the outer holding portion 17b and which are repeatedly bended in radial and circumferential direction so as to connect the inner holding portion 17a and the outer holding portion 17b; connecting holes 17r which are formed on four corners of the outer holding portion 17b; and open routes 17k which is formed by cutting off a part of the connecting holes 17r.

The open routes 17k are orthogonal to the optical axis and are hook-shape. Furthermore, the open routes 17k extend from the connecting holes 17r generally parallel to the borders of outer holding portion 17b, and is opened towards the outside of the outer holding portion 17b. The width d1 of the open route 17k is narrower than the outer diameter d2 of the linear spring member 20.

As to the mounting methods of the spring members 20, after the back end 20b is embedded into the connecting hole 21r and is slightly tilted relative to Z-axis, the front end 20a is pressed in from the open side of open route 17k formed at the front spring member 17A. Subsequently, the open route 17k is pushed aside while making the connecting hole 17r of the front spring member 17C and the circumference of the open route 17k elastically deformed, so that it is moved to the inner side of the connecting hole 17r. Because the width d1 of the open route 17k is narrower than the outer diameter d2 of the spring member 20, even before fixating the front end 20a, the spring member 20 may still be temporarily engaged in the connecting hole 17r and will not fall off onto outside.

As described above, in the lens driver 10 with camera shake reducing function in the second embodiment, still no stress is applied to the front spring member 17c and the linear spring member 20, and the spring member 20 may be easily passed through (connect) the connecting hole 17r without damaging the front spring member 17C or the spring member 20. By doing this, the lens 18 of the lens driver 10 with camera shake reducing function may held at the lens holder 13 in a state of facing Z-axis accurately, therefore, the focusing unit 11 may accurately swing in X-axis direction and Y-axis direction.

Figure 3:
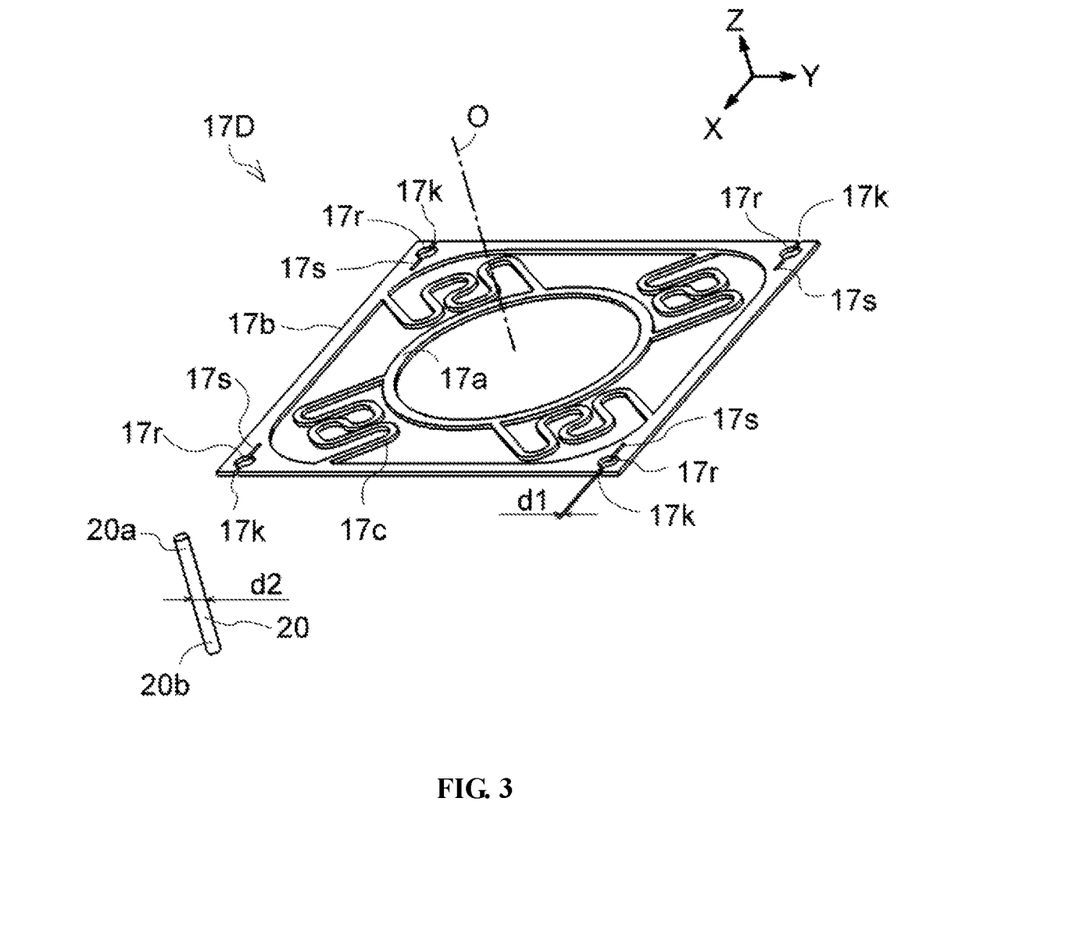
FIG. 3 is an illustration of the main part of a lens driver with camera shake reducing function of a variation of the third embodiment.

FIG. 3 is a perspective view of a plate-like front spring member 17D of the third embodiment. Furthermore, other structure than the front spring member 17D is the same as above, and hence it is omitted.

The front spring member 17D comprises: a ring-shaped inner holding portion 17a; an outer holding portion 17b in form of a box with four borders; a plurality of arms 17c which are located between the inner holding portion 17a and the outer holding portion 17b and which are repeatedly bended in radial and circumferential direction so as to connect the inner holding portion 17a and the outer holding portion 17b; connecting holes 17r which are formed on four corners of the outer holding portion 17b; and open routes 17k which is formed by cutting off a part of the connecting holes 17r.

The open route 17k is orthogonal to the optical axis 0, and forms a linear shape on the front spring member 17D, and it is opened from the connecting hole 17r towards the outside of the outer holding portion 17b. Furthermore, the width d1 of the open route 17k is narrower than the outer diameter d2 of the linear spring member 20. An open route 17k is formed radially on a side of the connecting hole 17r and a notch 17s is formed radially on another side of the connecting hole 17r. That is, centered on the connecting hole 17r, an open route 17k is formed on one side and a notch 17s is formed on the 180°-shifted opposite side, i.e. another side.

As to the mounting methods of the spring members 20, after the back end 20b is embedded into the connecting hole 21r and is slightly tilted relative to Z-axis, the front end 20a is pressed in from the open side of open route 17k formed at the front spring member 17D. Subsequently, the open route 17k is pushed aside while making the connecting hole 17r and the circumference of the open route 17k and the notch 17s elastically deformed, so that it is moved to the inner side of the connecting hole 17r. Because the width d1 of the open route 17k is narrower than the outer diameter d2 of the spring member 20, even before fixating the front end 20a, the spring member 20 may still be temporarily engaged in the connecting hole 17r and will not fall off onto outside.

As described above, in the lens driver 10 with camera shake reducing function in the third embodiment, still no stress is applied to the front spring member 17O and the linear spring member 20, and the spring member 20 may be easily passed through (connect) the connecting hole 17r without damaging the front spring member 17D or the spring member 20. By doing this, the lens 18 of the lens driver 10 with camera shake reducing function may held at the lens holder 13 in a state of facing Z-axis accurately, therefore, the focusing unit 11 may accurately swing in X-axis direction and Y-axis direction.

Figure 4:
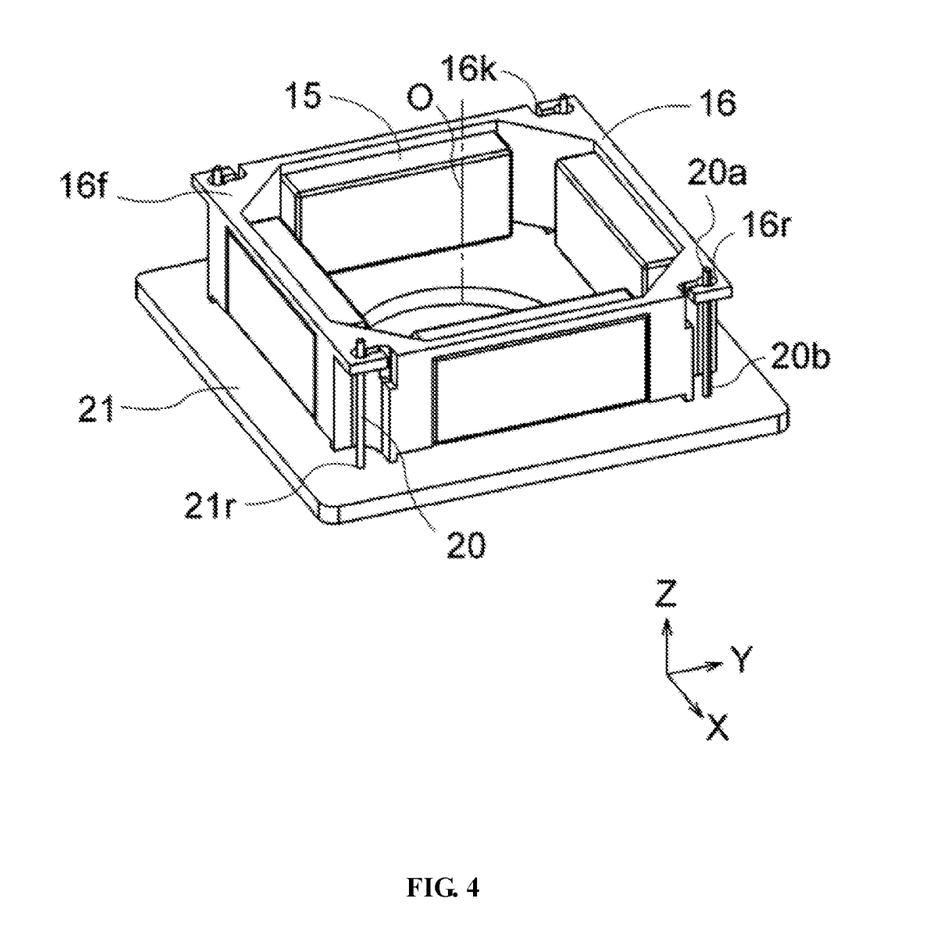
FIG. 4 is a perspective view of the main part of a lens driver with camera shake reducing function of a variation of the first embodiment.

FIG. 4 is a perspective view of the main part of a lens driver 10 with camera shake reducing function of a variation of the first embodiment. In this embodiment, ends 20a on front side and ends 20b on back side of the spring members 20 pass through (connect) the connecting hole 16r of the magnet holder 16 and the connecting hole 21r of the base 21, so as to hold the focusing unit 11 such that it may swing in X-axis direction and Y-axis direction, which is different from the first embodiment. That is, in this example, the ends 20a on front side of the spring members 20 are not connected to the front spring member 17A.

The magnet holder 16 further comprises: connecting holes 16r which are formed at the flange 16f on four corners of the magnet holder 16; and open routes 16k which are formed by cutting off a part of the connecting hole 16r. The open route 16k is orthogonal to the optical axis and is hook-shape. Furthermore, the open routes 16k extend outwards from the connecting hole 16r and are opened at the ends.

As to the mounting methods of the spring members 20, after the back end 20b is embedded into the connecting hole 21r and is slightly tilted relative to Z-axis, the front end 20a is inserted from the open side of open route 16k formed at the magnet holder 16 and moved to the inner side of connecting hole 16r. Furthermore, because the open route 16k is bent as a hook, even before the front end 20a is fixated, the spring member 20 may still be temporarily engaged in the middle of the open route 16k, and will not fall off onto the outside of the connecting hole 16r.

As described above, in the lens driver 10 with camera shake reducing function in the this embodiment, still no stress is applied to the linear spring member 20, and the spring member 20 may be easily passed through (connect) the connecting hole 16r without damaging the front spring member 17D or the spring member 20. By doing this, the lens 18 of the lens driver 10 with camera shake reducing function may held at the lens holder 13 in a state of facing Z-axis accurately, therefore, the focusing unit 11 may accurately swing in X-axis direction and Y-axis direction.

Figure 5:
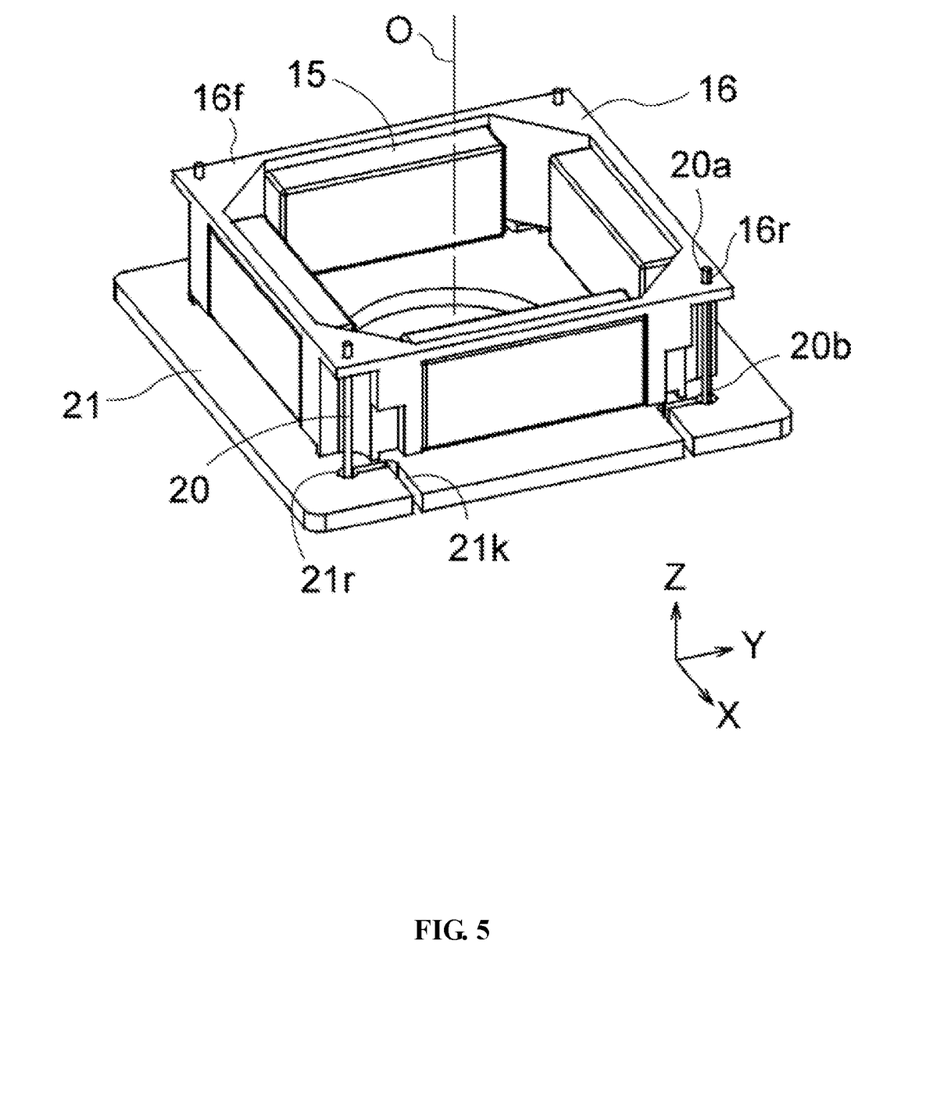
FIG. 5 is a perspective view of the main part of a lens driver with camera shake reducing function of another variation of the first embodiment.

FIG. 5 is a perspective view of the main part of a lens driver 10 with camera shake reducing function of another variation of the first embodiment, in this embodiment, ends 20a on front side and ends 20b on back side of the spring members 20 pass through (connect) the connecting hole 16r of the magnet holder 16 and the connecting hole 21r of the base 21, so as to hold the focusing unit 11 such that it may swing in X-axis direction and Y-axis direction, which is different from the first embodiment. That is, in this example, the ends 20a on front side of the spring members 20 are not connected to the front spring member 17A.

Connecting holes 16r are opened at the flange 16f on four corners of the magnet holder 16. The base 21 comprises; connecting holes 21r; and open routes 21k which are formed by cutting off a part of the connecting holes 21r. The open routes 21k are orthogonal to the optical axis and are hook-shape. Furthermore, the open routes 21k extend from the connecting hole 21r and are opened outwards.

As to the mounting methods of the spring members 20, after the front end 20a is embedded into the connecting hole 16r from −Z side and is slightly tilted relative to Z-axis, the back end 20b is inserted from the open side of open route 21k formed at the base 21 and moved to the inner side of connecting hole 21r. Furthermore, because the open route 21k is bent as a hook, even before the back end 20b is fixated, the spring member 20 may still be temporarily engaged in the middle of the open route 21k, and will not fall off onto the outside of the connecting hole 21r.

The invention is explained using the above embodiments, but the scope of the invention is not limited to the scope recited in the above embodiments. Those skilled in the art may perform various alterations or improvement on the various embodiments. It is appreciated from the claims that these altered or improved embodiments also fall within the scope of the invention.

For example, the open route 17k, the open route 21k may not only be arranged at one of the connecting hole 17r of the front spring member and the connecting hole 21r of the base 21, but also may be arranged at the both connecting holes 17r and 21r.

What is claimed:

1. A lens driver with camera shake reducing function, wherein a direction of a photographed object is taken as a forward direction of an optical axis of a lens, the lens driver comprising:
    a focusing unit, which causes a lens holder holding the lens to move in the direction of the optical axis; and
    a camera shake reducing unit, which causes the focusing unit to swing in a direction orthogonal to the direction of the optical axis via a plurality of linear spring members extending in the direction of the optical axis;
    wherein the focusing unit and the camera shake reducing unit define a plurality of connecting holes which are opened in the direction of the optical axis;
    wherein ends of the plurality of spring members pass through the connecting holes;
    wherein at least one of the focusing unit and the camera shake reducing unit also defines a plurality of open routes, each open route extends from a corresponding connecting hole in a direction orthogonal to the optical axis through an edge thus communicates with an outside of the at least one of the focusing unit and the camera shake reducing unit;
    wherein during a mounting procedure of each spring member, an end of the spring member is inserted in a corresponding open route from the outside and then is moved to a corresponding connecting hole before the spring member is connected to the connecting hole;
    wherein a width of the open route is smaller than an outer diameter of the spring member.

2. A lens driver with camera shake reducing function, wherein a direction of a photographed object is taken as a forward direction of an optical axis of a lens, the lens driver comprising:
    a focusing unit, which causes a lens holder holding the lens to move in the direction of the optical axis; and
    a camera shake reducing unit, which causes the focusing unit to swing in a direction orthogonal to the direction of the optical axis via a plurality of linear spring members extending in the direction of the optical axis;
    wherein the focusing unit and the camera shake reducing unit define a plurality of connecting holes which are opened in the direction of the optical axis;
    wherein ends of the plurality of spring members pass through the connecting holes;
    wherein at least one of the focusing unit and the camera shake reducing unit also defines a plurality of open routes, each open route extends from a corresponding connecting hole in a direction orthogonal to the optical axis through an edge thus communicates with an outside of the at least one of the focusing unit and the camera shake reducing unit;
    wherein during a mounting procedure of each spring member, an end of the spring member is inserted in a corresponding open route from the outside and then is moved to a corresponding connecting hole before the spring member is connected to the connecting hole;
    wherein each open route is formed radially on a side of the corresponding connecting hole and a notch is formed radially on another side of the corresponding connecting hole.

3. A lens driver with camera shake reducing function, wherein a direction of a photographed object is taken as a forward direction of an optical axis of a lens, the lens driver comprising:
    a focusing unit, which causes a lens holder holding the lens to move in the direction of the optical axis; and
    a camera shake reducing unit, which causes the focusing unit to swing in a direction orthogonal to the direction of the optical axis via a plurality of linear spring members extending in the direction of the optical axis;
    wherein the focusing unit and the camera shake reducing unit define a plurality of connecting holes which are opened in the direction of the optical axis;
    wherein ends of the plurality of spring members pass through the connecting holes;
    wherein at least one of the focusing unit and the camera shake reducing unit also defines a plurality of open routes, each open route extends from a corresponding connecting hole in a direction orthogonal to the optical axis through an edge thus communicates with an outside of the at least one of the focusing unit and the camera shake reducing unit;
    wherein during a mounting procedure of each spring member, an end of the spring member is inserted in a corresponding open route from the outside and then is moved to a corresponding connecting hole before the spring member is connected to the connecting hole;
    wherein the focusing unit comprises a front spring member connected to the lens holder from a front side of the optical axis of the lens; the front spring member comprises;
    a ring-shaped inner holding portion;
    a square outer holding portion; and
    a plurality of arms configured between the inner holding portion and the outer holding portion and repeatedly bended in radial and circumferential direction so as to connect the inner holding portion and the outer holding portion;

wherein each corner of the outer holding portion has one of the plurality of connecting holes and one of the plurality of open routes; in each corner, the open route extends from the connecting hole and through a border/edge of the outer holding portion, permitting the connecting hole to communicate with the outside of the outer holding portion via the open route;

wherein each open route extends from the corresponding connecting hole parallel to the border/edge of the outer holding portion and through the border/edge of the outer holding portion in a straight line; a width of the open route is narrower than an outer diameter of the spring member fixed in the connecting hole.

4. The lens driver with camera shake reducing function of claim 3, wherein for each corner of the outer holding portion of the front spring member, a notch is also defined and communicates with the connecting hole from an opposite side of the connecting hole in relative to the open route.

\* \* \* \* \*